US008132738B2

(12) United States Patent
Fraccaro

(10) Patent No.: US 8,132,738 B2
(45) Date of Patent: Mar. 13, 2012

(54) DEVICE FOR HEATING, GENERATING ELECTRIC POWER, AND COOLING ENCLOSED SPACES

(75) Inventor: Gimmi Fraccaro, Castelfranco Veneto (IT)

(73) Assignee: Officine Termotecniche Fraccaro -O.T.F. S.R.L., Castelfranco Veneto (IT)

( * ) Notice: Subject to any disclaimer, the term of this patent is extended or adjusted under 35 U.S.C. 154(b) by 951 days.

(21) Appl. No.: 11/989,115

(22) PCT Filed: Nov. 8, 2006

(86) PCT No.: PCT/EP2006/068215
§ 371 (c)(1),
(2), (4) Date: Jan. 22, 2008

(87) PCT Pub. No.: WO2007/054507
PCT Pub. Date: May 18, 2007

(65) Prior Publication Data
US 2009/0152367 A1 Jun. 18, 2009

(30) Foreign Application Priority Data

Nov. 8, 2005 (IT) ............................... TV2005A0171

(51) Int. Cl.
*F25B 27/02* (2006.01)
*F24D 7/00* (2006.01)
(52) U.S. Cl. ....................... 237/12.1; 60/39.511; 290/52
(58) Field of Classification Search .................. 237/12.1; 60/39.511; 290/52; *F25B 27/02; F24D 7/00, F24D 5/08*
See application file for complete search history.

(56) References Cited

U.S. PATENT DOCUMENTS

| 2,463,409 | A | * | 3/1949 | Moody ........................... 62/468 |
| 2,626,501 | A | * | 1/1953 | Pavlecka et al. ........... 60/39.511 |
| 3,128,756 | A | * | 4/1964 | Galvin ...................... 126/116 R |
| 4,336,693 | A | * | 6/1982 | Hays et al. ...................... 60/651 |
| 4,649,307 | A | * | 3/1987 | Bech .............................. 310/99 |
| 4,987,748 | A | * | 1/1991 | Meckler ....................... 62/176.1 |
| 5,273,210 | A | * | 12/1993 | Pender et al. ................... 237/53 |
| 5,586,430 | A | * | 12/1996 | Stopa ......................... 60/39.511 |
| 5,713,154 | A | * | 2/1998 | Goldstein et al. ................. 47/17 |
| 6,227,451 | B1 | * | 5/2001 | Caruso .......................... 237/2 A |

(Continued)

FOREIGN PATENT DOCUMENTS

DE 93 09 395 U1 9/1993

(Continued)

OTHER PUBLICATIONS

JP 2002-333233A machine translation of description.*

(Continued)

*Primary Examiner* — Steven B McAllister
*Assistant Examiner* — Phillip E Decker
(74) *Attorney, Agent, or Firm* — Themis Law

(57) ABSTRACT

A device for heating, generating electric power and cooling enclosed spaces, which is connected to at least one closed-circuit pipe which acts by thermal radiation and comprises at least one turbine or microturbine of the axial or tangential type or of the type that merges into the closed-circuit pipe, placed in partial vacuum by means of a first fan. An alternator for generating electric power and elements for feeding the power to the grid or to user devices, and an absorber for generating cool air or refrigerated water, are connected to the turbine or microturbine.

12 Claims, 4 Drawing Sheets

U.S. PATENT DOCUMENTS

| | | | |
|---|---|---|---|
| 6,446,385 B1 | 9/2002 | Crutcher | |
| 6,477,852 B2 * | 11/2002 | Dodo et al. | 62/238.3 |
| 6,745,574 B1 * | 6/2004 | Dettmer | 60/39.511 |
| 7,472,550 B2 * | 1/2009 | Lear et al. | 60/39.511 |
| 2002/0152754 A1 * | 10/2002 | MacKay | 60/39.511 |
| 2003/0019229 A1 * | 1/2003 | Dodo et al. | 62/238.3 |
| 2003/0051496 A1 * | 3/2003 | Fukushima et al. | 62/238.3 |
| 2004/0098965 A1 | 5/2004 | Dettmer | |
| 2004/0237540 A1 | 12/2004 | Okano et al. | |
| 2005/0028529 A1 * | 2/2005 | Bartlett et al. | 60/39.52 |
| 2007/0012045 A1 * | 1/2007 | Chandran et al. | 60/39.12 |

FOREIGN PATENT DOCUMENTS

| | | |
|---|---|---|
| DE | 93 10 646 U1 | 11/1993 |
| EP | 0 079 526 A1 | 5/1983 |
| EP | 0 647 819 A1 | 4/1995 |
| EP | 1132595 A2 * | 9/2001 |
| FR | 2 609 157 A | 7/1988 |
| JP | 2002 333233 A | 11/2002 |
| WO | WO 96/37735 * | 11/1996 |
| WO | WO 96/37735 A | 11/1996 |
| WO | WO 2004/077586 A | 9/2004 |

OTHER PUBLICATIONS

PureComfort 240M website, Jul. 24, 2004, http://web.archive.org/web/20040724035326/http://www.utcpower.com/.*

* cited by examiner

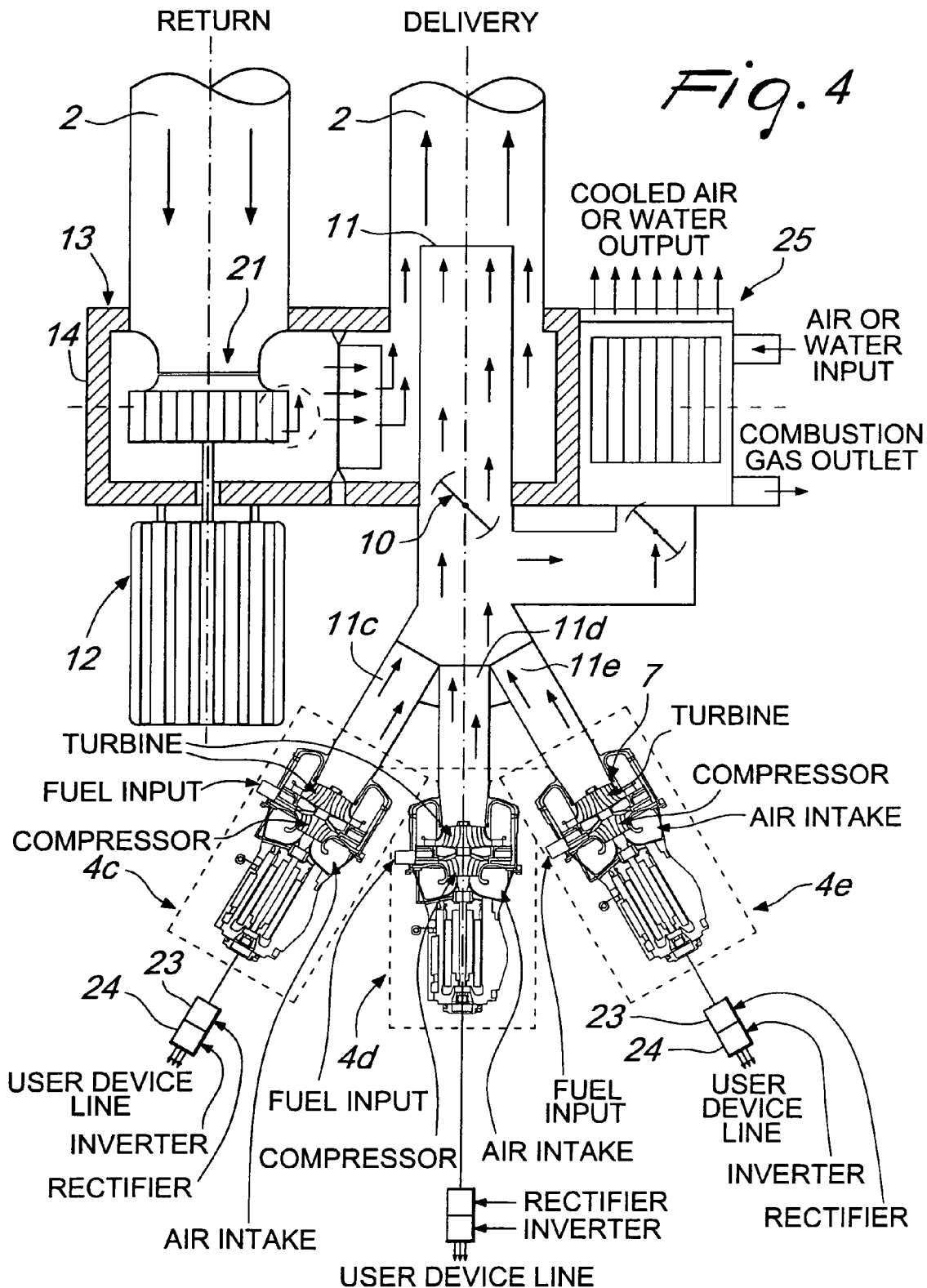

DEVICE FOR HEATING, GENERATING ELECTRIC POWER, AND COOLING ENCLOSED SPACES

The present invention relates to a device for heating, generating electric power and cooling enclosed spaces, such as hangars for aircraft, theaters, movie theaters, high-rise warehouses, commercial, industrial and handicraft buildings, which usually are very tall and have large surfaces.

BACKGROUND OF THE INVENTION

For this purpose, systems are known which comprise a closed circuit composed of a plurality of pipes arranged approximately at the roof or ceiling of the enclosed space; warm air is circulated within such pipes.

The heating effect is achieved by radiation from the surface of such pipes toward the floor by way of the presence of appropriately provided thermally insulating reflective screens.

A system of this type is disclosed in Italian patent No. 1,037,880 and GB-A-1448073, which comprises a burner arranged directly at the pipe and a fan for feeding the gaseous heating medium through the pipe, said fan being arranged upstream or downstream of the burner.

The burner is of the forced-draft type and is inserted at the pipe, which has the shape of a closed loop.

This solution has a drawback: the use of forced draft burners in fact generates in the pipe a preset pressure which forces continuous and accurate maintenance, which can be performed by extremely qualified individuals, to check for any leaks from said pipe.

Further heating systems are disclosed in prior art documents EP-A-0079526 and EP-A-0503489.

Further, the use of forced draft gas burners forces the provision of devices which are structurally complicated and difficult to fine-tune; the large number of moving mechanical parts makes the device prone to failures and therefore to considerable maintenance, and at the same time has high overall costs.

As a partial solution to this drawback, EP-647819 discloses a device for heating enclosed spaces which comprises at least one closed-circuit pipe which acts by thermal radiation, a burner for supplying a flame at the pipe for the direct heating of a heating medium, and a fan arranged upstream of said burner at said pipe in order to produce inside it a negative pressure, said heating medium being constituted by a mixture of gases and combustion air.

The burner is a Venturi-tube multi-hole burner, which provides a combined flame which lies within a fire tube which surrounds laterally said combined flame so as to provide a chamber in which the heating medium is dispensed laterally with respect to the fire tube and is circulated around it, after which the heating medium mixes downstream of said fire tube with a flame combustion gas and air drawn from outside due to the negative pressure produced by said fan and by jets of pressurized combustible gas within said Venturi-tube multi-hole burner.

Although this solution solves the drawbacks of the cited background art, the emission of pollutants is observed: heating devices of the radiating pipe type, which use forced-draft burners or with Venturi-tube burners or mixing tubes, in fact generate from combustion products whose values of CO (carbon monoxide), $CO_2$ (carbon dioxide) and $NO_x$ (nitrogen oxides) are rather high.

Further, in the enclosed spaces in which these devices are installed, it is necessary to use, if they must be climate-controlled, also appropriately provided cooling devices, with the need to provide within the enclosed space separate pipes, ducts and electrical connections for supplying said devices and dispensing the air at a cooled temperature.

Moreover, known devices do not allow partial recovery of the energy that they generate.

As a partial solution to this drawback, so-called "cogeneration" systems are known which are usually constituted by a thermoelectric system for the combined production of electric power and heat energy, which is useful for increasing the efficiency of the fuel that is used.

However, these systems have considerable drawbacks: mainly they are very expensive, since they require a heating unit and therefore a boiler to generate and convey, through appropriately provided ducts, water in a circuit which comprises for example batteries for heat exchange.

Costs are therefore increased also by all the accessories for providing said pipes and circuits, to which it is necessary in any case to add all the circuits required if one wishes to provide climate control (cooling) of the enclosed space.

Known cogeneration systems include for example the ones known by the trade names Capstone, Elliott, and Turbec.

Currently it is also known to use microturbines to produce simultaneously electric power and hot water for the winter heating of buildings, or only to produce electric power, dispersing into the atmosphere the combustion gases.

It is also known to use microturbines to generate simultaneously electric power and hot water, which is sent subsequently into an absorber and produces refrigerated water for cooling and summer climate control of enclosed spaces in general.

However, even these solutions have drawbacks: for the winter heating of industrial enclosed spaces, one of the negative factors of the application of a microturbine is due to the fact that the hot combustion gases are used to heat the water normally to 80-90° C.; this water is then sent into heat exchangers, which in turn heat the air of the enclosed spaces.

This solution has a severe drawback, since the air, after being heated in the heat exchanger, decreases its specific gravity and tends to rise, generating inside the heated enclosed spaces high temperatures at the ceiling, which cause great heat loss and therefore great waste of energy.

For example, in a commercial or production space with a height of approximately 7 meters, ceiling temperatures of approximately 35° C. are found in order to have an air temperature of 18° C. at eye level.

Therefore, all the energy used to heat the air volumes that lie above the people to a temperature above 18° C. is a great energy waste.

Further, the hot gases heat the water by means of an exchanger, and such heated water can heat the air of the enclosed space by means of another exchanger: accordingly, long times to reach the steady state of the system are observed, since there are many transfer fluids involved in the heat exchanges.

Moreover, microturbine technology is currently very expensive, since said microturbines are derived from the aviation sector and it is extremely difficult to obtain variable-power microturbines which accordingly are small (for small buildings), medium-sized (for medium-sized buildings) and large (for large buildings).

SUMMARY OF THE INVENTION

The aim of the present invention is to solve the above mentioned problems, eliminating the drawbacks of the cited background art, by providing a device which allows to obtain both optimum heating of even large enclosed spaces and their optional cooling, as well as optimization of the energy balance, with the possibility to generate electric power to be supplied to the user devices of the controlled enclosed space or to the electrical grid.

Within this aim, an object of the invention is to provide a device which allows to achieve a high energy yield of the gaseous and liquid fuels that are used, obtaining at the same time a high containment of the polluting emissions of CO, $CO_2$ and $NO_x$.

Another object is to provide a device which allows to increase the performance for heating by radiation.

A further object is to provide a device which allows to cool the enclosed space quickly and simply at low cost.

A still further object is to provide a device which allows to reduce fuel consumption and electric power consumption, allows better protection of the environment and has low production, installation and maintenance costs.

Still another object is to provide a device which allows to obtain all the required heating power levels of the various buildings, simply by means of a simple variation thereof, so as to allow optimum industrialization and achieve low production costs.

This aim and these and other objects, which will become better apparent hereinafter, are achieved by a device for heating, generating electric power and cooling enclosed spaces, which is connected to at least one closed-circuit pipe which acts by thermal radiation, characterized in that it comprises at least one turbine or microturbine of the axial or tangential type or of the type that merges into said closed-circuit pipe arranged in partial vacuum by means of a fan, an alternator for generating electric power, means for feeding said power to the grid or to user devices, and an absorber for generating cool air or refrigerated water being connected to said at least one turbine or microturbine.

BRIEF DESCRIPTION OF THE DRAWINGS

Further characteristics and advantages of the invention will become better apparent from the following detailed description of a particular but not exclusive embodiment thereof, illustrated by way of non-limiting example in the accompanying drawings, wherein:

FIG. 4 is a view, similar to FIG. 3, of the use of three microturbines.

Figure 1:
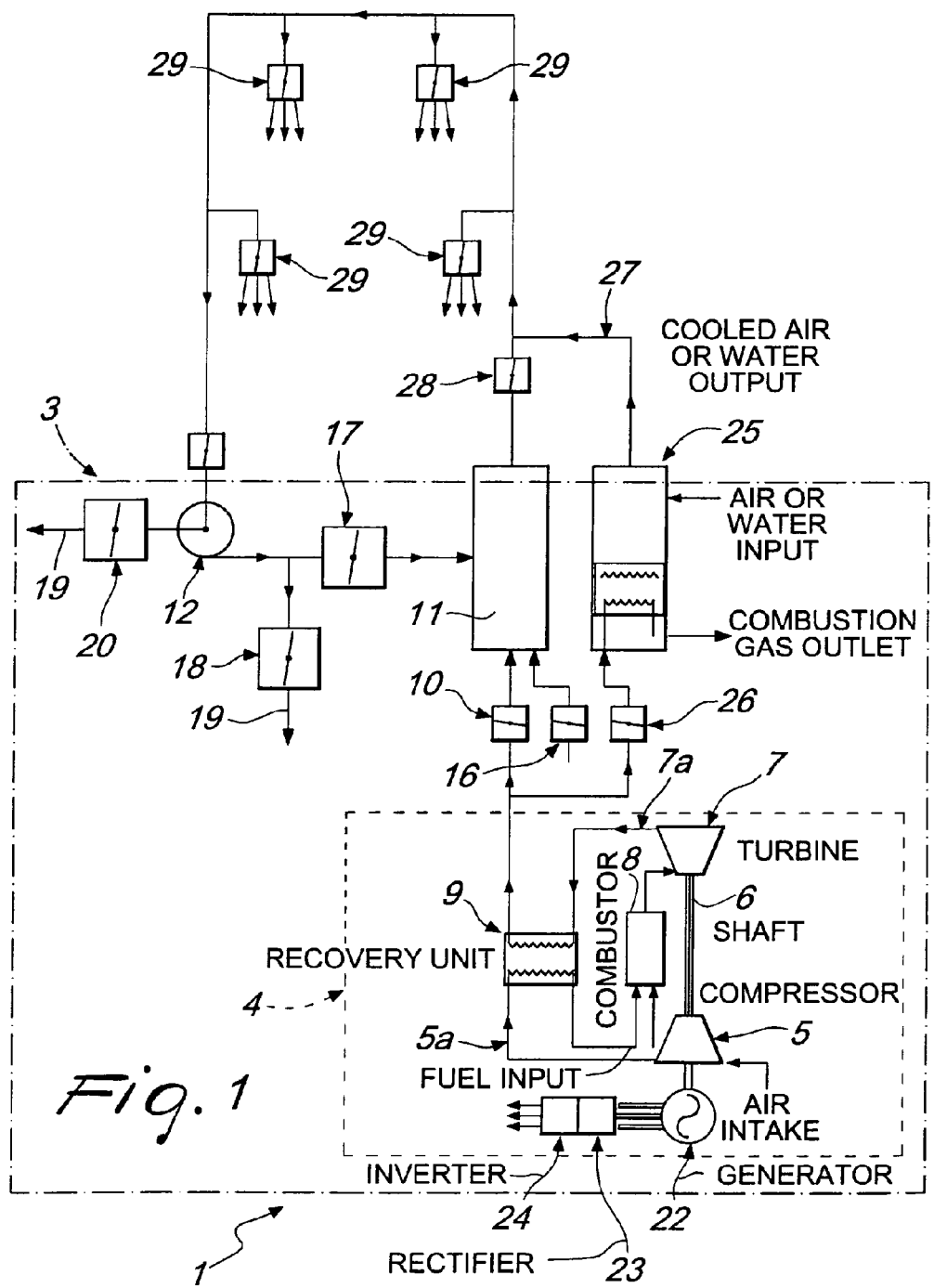
FIG. 1 is a schematic view of the device according to the invention.

In the exemplary embodiments that follow, individual characteristics, given in relation to specific examples, may actually be interchanged with other different characteristics that exist in other exemplary embodiments.

Moreover, it is noted that anything found to be already known during the patenting process is understood not to be claimed and to be the subject of a disclaimer.

DESCRIPTION OF THE PREFERRED EMBODIMENTS

With reference to the figures, the reference numeral 1 designates a device for heating, generating electric power and cooling enclosed spaces, such as for example aircraft hangars, theaters, movie theaters, high-rise warehouses, and commercial, industrial and handicraft buildings, which usually are very tall and have large surfaces.

The device comprises at least one pipe, designated by the reference numeral 2, of the closed-circuit type, which acts by heat radiation.

The circuit can have a chosen shape depending on the size of the enclosed space.

The device is contained advantageously within a container or monobloc unit, designated by the reference numeral 3, which is compact and can be connected directly to the pipe 2.

At least one turbine or microturbine 4 is provided within the monobloc unit 3; small turbines, commonly known also as microturbines, are currently known which are predominantly derived from the aviation sector and are known commercially by the trade names SAUER GT 15, WILLIAMS WR 24, DEUTZ KHD T 216, GARRETT GTCP 85 and SCROLL.

Such turbines or microturbines can be of the axial or tangential type and are constituted usually by a compressor 5 which is connected, by means of an appropriately provided shaft 6, to a turbine 7 which is supplied, by means of an appropriately provided combustor 8, with the intended fuel.

There is also a recovery unit 9, to which the discharge 5*a* of the compressor 5 and the discharge 7*a* of the turbine 7 are connected; said recovery unit conveys the burnt gases through a first gate 10 into an appropriately provided chamber 11 arranged directly at, and connected to, the pipe 2.

Figure 2:
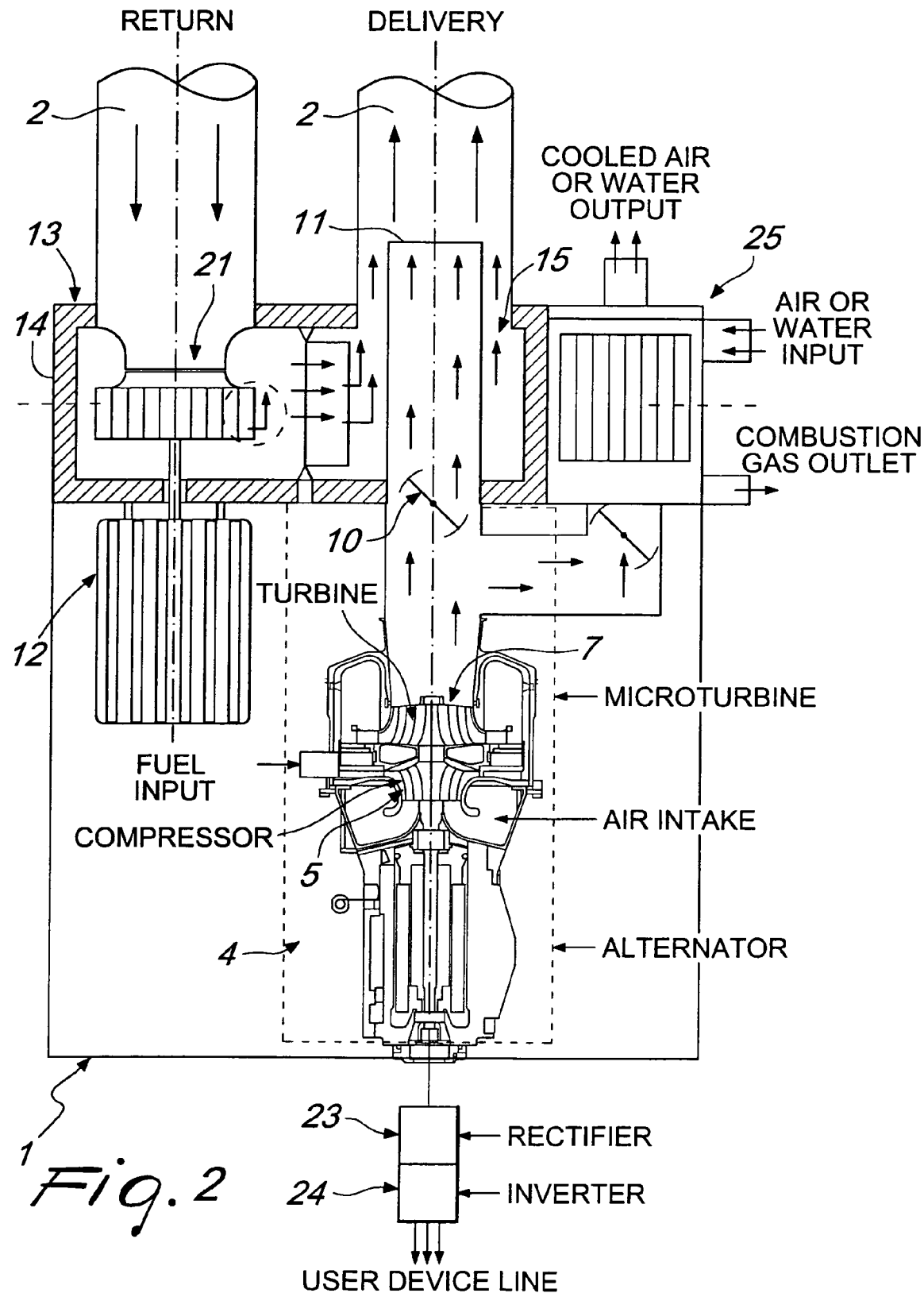
FIG. 2 is a schematic view of part of the device which uses a single microturbine.

The turbine or microturbine 4 can be of the axial type, as shown in FIG. 2, in which the shaft 6 is axially aligned with the chamber 11 and the pipe 2, or of the tangential type, in which the discharge of the burnt gases occurs approximately at right angles to said shaft.

Figure 3:
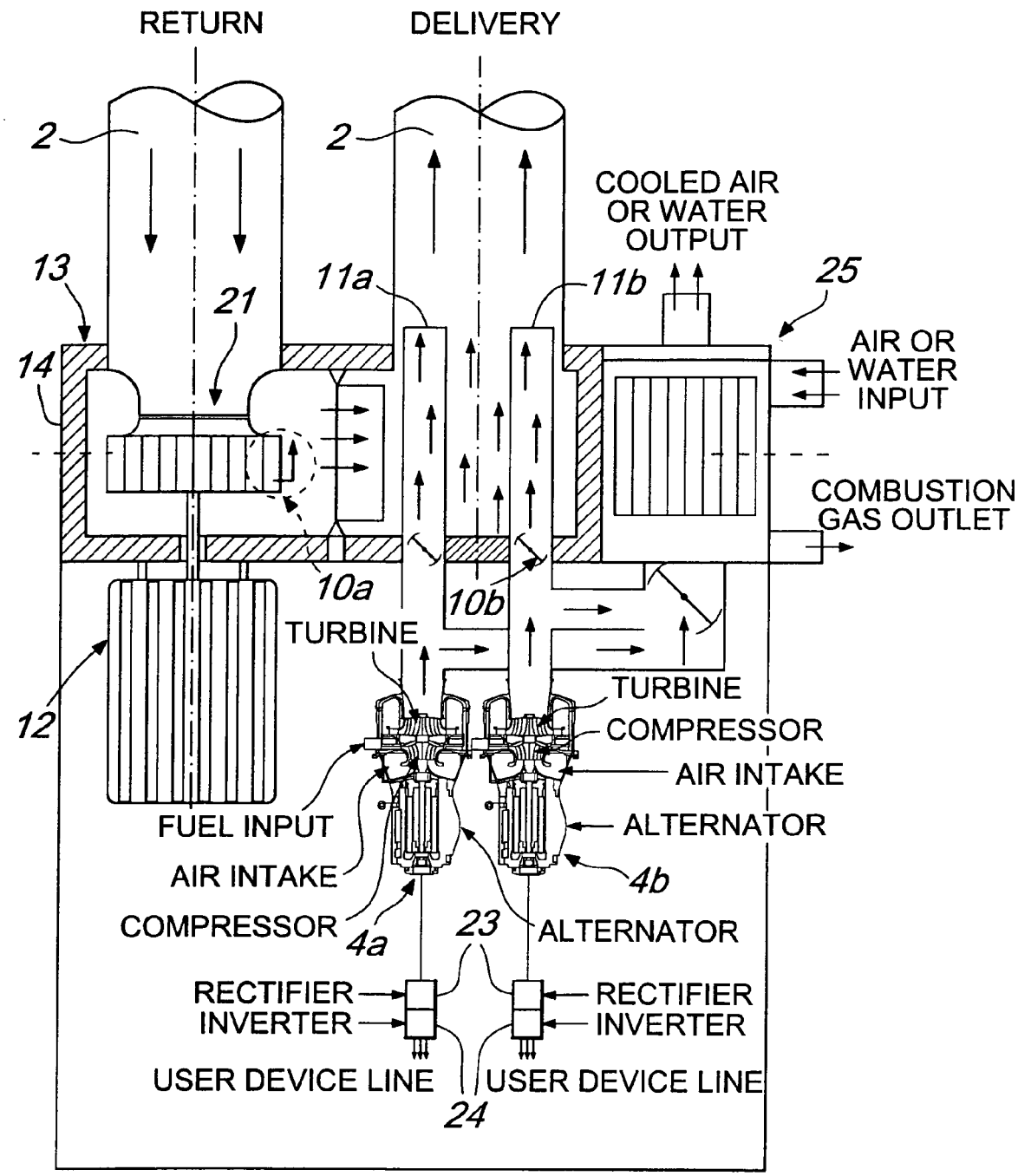
FIG. 3 is a view, similar to FIG. 2, of the use of a pair of microturbines.

The number of turbines or microturbines can be chosen at will and therefore there can be just one, as shown in FIG. 2, or more than one, as shown in FIG. 3, in which two microturbines, designated by the reference numerals 4*a* and 4*b*, are used which are arranged mutually side-by-side and discharge the burnt gases axially with respect to an appropriately provided chamber, designated by the reference numerals 11*a* and 11*b*, which is arranged internally and is connected to the pipe 2.

As an alternative, is also possible to consider the use of three turbines or microturbines, as shown in FIG. 4, which are designated by the reference numerals 4*c*, 4*d* and 4*e*.

Such turbines or microturbines can be of the axial or tangential type and in the first case have, as shown in FIG. 4, respectively a chamber 11*c*, 11*d* and 11*e*, which lead into a single chamber 11, which is arranged inside the pipe 2 and connected thereto.

In this case, it is again possible to use a single first gate valve 10, while in the case shown in FIG. 3 the microturbine 4*a* and the microturbine 4*b* have, in each one of the chambers 11*a* and 11*b*, an appropriately provided first gate valve designated by the reference numerals 10*a*, 10*b*.

The pipe 2 is placed advantageously in partial vacuum, since there is a fan 12 which is arranged advantageously in a region which is adjacent to the turbine or microturbine 4 within the monobloc unit 3, its impeller being arranged within an appropriately provided containment element 13, provided with a suitable insulation 14, into which the pipe 2 leads both for delivery and for return.

The impeller of the fan 12 is therefore adjacent to the chamber 11 and is also partially contained within the containment element 13.

The fan 12 then draws the burnt gas, sending it into an appropriately provided second chamber 15 which is arranged coaxially to the first chamber 11, obtaining, downstream of said first chamber, a mixing between the combustion flame gas, which contains a certain amount of air which can be drawn for example from outside by means of the second gate valve 16, and of burnt air, thus allowing to obtain a gaseous fluid at high temperature without the aid of a heat exchanger.

Preferably, between the fan 12 and the microturbine 4 there is a third gate valve 17, inserted in order to adjust the flow-rate of the burnt gas, and there is also a fourth gate valve 18 for adjusting the discharge of the exhaust gases at an exhaust 19.

As an alternative to, or in combination with, the fourth gate valve 18 there is a fifth gate valve 20, which is connected to the fan 12 so as to allow the discharge of the burnt gas at an appropriately provided similar exhaust 19.

Of course, in the mixing of the air that circulates within the pipe 2 with the product of combustion and the flame of the microturbine there is a very specific ratio, since the amount of air and gas required for combustion which is mixed is equal to the amount of combustion gas in output from the exhaust 19.

Accordingly, in such device there is an intake for air and burnt gases produced by the microturbine 4 due to the partial vacuum produced by the fan 12 on the delivery duct of the pipe 2.

Advantageously, as shown in FIG. 2, the intake 21 of the fan 12 is arranged approximately at the center of the return duct of the pipe 2.

An alternator 22, and therefore a rotary machine which converts mechanical energy into AC electric power, for sending it to the grid or for use in the enclosed space, is further connected to the turbine or microturbine 4; additional means, such as a rectifier 23 and an inverter 24 for converting the DC current into AC current, are optionally provided.

An absorber 25 which can be used to cool the enclosed space also constitutes the device.

Such absorber draws, by means of an appropriately provided sixth gate valve 26, the burnt gases that arrive from the turbine 4, the heat of which runs appropriately provided absorption refrigeration machines of a known type, which provide an output for cooling water or air, designated by the reference numeral 27, which can be conveyed at the delivery of the pipe 2 downstream of an appropriately provided seventh gate valve 28 which is adjacent to the chamber 11 and can be conveyed into the environment by means of appropriately provided diffusers 29 which are connected to the pipe 2, with the interposition of appropriately provided gate valves.

Absorbers of two types are currently known: ammonia-water (marketed for example under the trade name ROBUR) or lithium bromide-water (marketed under the trade names EBARA, CENTURY, BCT).

It has thus been found that the invention has achieved the intended aim and objects, a device having been provided which allows to achieve both optimum heating of even large enclosed spaces and their optional cooling, as well as the possibility to generate electric power to be fed to the user devices of the controlled enclosed space or to the electrical grid, as well as a high energy yield of the gaseous and liquid fuels used, obtaining at the same time a high containment of the polluting emissions of $CO$, $CO_2$ and $NO_x$.

The device further allows to reduce fuel consumption and to achieve better protection of the environment and has low production, installation and maintenance costs.

The adaptability of the device to the specific requirements of the enclosed space in which it is to be installed is high, since it is possible to achieve all the heating power levels required by means of a simple structural variation of the device, for example by activating one or more microturbines according to contingent requirements.

The device allows to generate electric power, which can be sold or used by the demand of the building, thus also avoiding losses generated by the distribution grid.

Further, the hot gases, which have a temperature which can vary from 200 to 500° C., are introduced directly into the radiating circuit, which in a few minutes reaches the steady state, diffusing by radiation the heat inside the enclosed space, in which there are no differences in air temperature between the ceiling and people, thus achieving lower heat losses and therefore reduced fuel waste.

The ability to arrange the device within a container or a monobloc unit of compact size which can be connected directly to said pipe further allows to arrange said device in any point outside or inside the enclosed space in view of the small size with respect to known systems of equal capacity.

Further, by providing a compact monobloc unit which is connected directly to the heating circuit, production costs are reduced due to the lack of connecting pipes, as occurs instead when using ordinary microturbines, which are currently used in known types of cogeneration systems.

Moreover, the constructive simplicity allows quick and easy maintenance, which can be performed even by personnel which is not particularly trained and therefore with very low production, installation and management costs.

As regards the field of application, the described solution can be used to provide for example also the heating and cooling of an oven, for example of the tunnel type, simultaneously generating electric power.

The device according to the invention is of course susceptible of numerous modifications and variations, all of which are within the scope of the appended claims.

Thus, for example, the exhaust gases and/or flames of one or more burners, for example of the forced-draft or induction or Venturi type, with simple mixing or with fuel conveyance devices, can converge at said appropriately provided chamber 11.

The climate control of enclosed spaces in fact entails peaks of heat or cold which turbines tolerate poorly and are unable to manage.

Therefore, in practice, by devising a product (a monobloc unit) in which the turbine (or turbines) turn(s) always at the same rate to provide the energy that is normally used on average and in which there is also a burner (or a plurality of burners) of any type which switches on and off as the energy load of the building changes, leaving the turbine operating continuously, an apparatus is provided which is simple and very flexible in use.

The materials used, as well as the dimensions that constitute the individual components of the invention, may of course be more pertinent according to specific requirements.

The various means for performing certain different functions need not certainly coexist only in the illustrated embodiment but can be present per se in many embodiments, including ones that are not illustrated.

The characteristics indicated as advantageous, convenient or the like may also be omitted or be replaced with equivalents.

The disclosures in Italian Patent Application No. TV2005A000171 from which this application claims priority are incorporated herein by reference.

The invention claimed is:

1. A device for heating, generating electric power and cooling enclosed spaces comprising:
a pipe having a delivery duct and a return duct defining a closed circuit configured to heat an enclosed space;
a container or monobloc unit coupled to said pipe; at least one turbine or microturbine disposed within said container or monobloc unit, said at least one turbine or microturbine having a shaft operatively coupled to a compressor and a discharge of burnt gases that is parallel or at a right angle in relation to said shaft;

a fan fluidly connected to said return duct, said fan providing at least some vacuum in said pipe;

a first chamber extending from said at least one turbine or microturbine into said delivery duct;

a second chamber fluidly disposed coaxially with the first chamber, said fan being fluidly connected with said second chamber to feed therein the burnt gases received from said return duct;

a recovery unit disposed within said container or monobloc unit, said compressor feeding a gas to said recovery unit, said at least one turbine or microturbine feeding the burnt gases from said at least one turbine or microturbine to said recovery unit such to cause a heat exchange with the gas from said compressor, said recovery unit conveying the burnt gases from said at least one turbine or microturbine into said first chamber;

an alternator for generating electric power;

means for feeding said power to a grid or to user devices; and an absorber for generating cool air or refrigerated water connected to said at least one turbine or microturbine, wherein said first chamber and said second chamber are in fluid communication with said delivery duct, causing therein a mixing of the burnt gases from said at least one turbine or microturbine and the burnt gases from said return duct, wherein the absorber is provided inside said container or monobloc unit to cool said enclosed space, and wherein said absorber draws, through one of at least seven gate valves, burnt gases that arrive from said at least one turbine or microturbine, whose heat operates absorption refrigeration machines producing cooling air or water which is conveyed at delivery of said pipe downstream of a gate valve adjacent to said first chamber and is further conveyed into the enclosed space with diffusers which are connected to said pipe with interposition of gate valves.

2. The device of claim 1, wherein said recovery unit conveys the burnt gases from said at least one turbine or microturbine into said first chamber through a first gate valve.

3. The device of claim 1, wherein said at least one turbine or microturbine has said discharge of the burnt gases parallel in relation to said shaft, and wherein said shaft is disposed actually with said first chamber and said delivery duct.

4. The device of claim 3, wherein the at least one turbine or microturbine comprises two or more turbines or microturbines having respective discharges of the burnt gases that are parallel one to the other and fluidly connected to connected to said pipe.

5. The device of claim 3, wherein the at least one turbine or microturbine comprises three or more turbines or microturbines having respective discharges of the burnt gases that fluidly connect to said pipe.

6. The device of claim 1, wherein an alternator, and a rotary machine which converts mechanical energy into AC electric power to be fed to a grid or to be used in the enclosed space, is connected to said at least one turbine or microturbine.

7. The device of claim 1, wherein said at least one turbine or microturbine is provided with a preheater for heating the combustion air which is suitable to increase efficiency.

8. The device of claim 1, wherein said at least one turbine or microturbine generates a transfer fluid which comprises combustion products, and which is introduced axially into said pipe of said closed circuit.

9. The device of claim 1, wherein said at least one turbine or microturbine and said absorber are provided in individual modular units, which can be installed on a ground, on a ceiling and on a wall in the circuit.

10. The device of claim 1, wherein one or more of combustion gases or flames of one or more burners converge at said first chamber.

11. The device of claim 10, wherein said one or more burners are forced-draft, induction, or Venturi burners and operate by simple mixing or fuel conveyance.

12. The device of claim 1, wherein said at least one turbine or microturbine has the discharge of the burnt gases disposed at the right angle in relation to said shaft.

* * * * *